INVENTOR.
PAUL G. DUNMIRE
ATTORNEY 2,936,186
Patented May 10, 1960

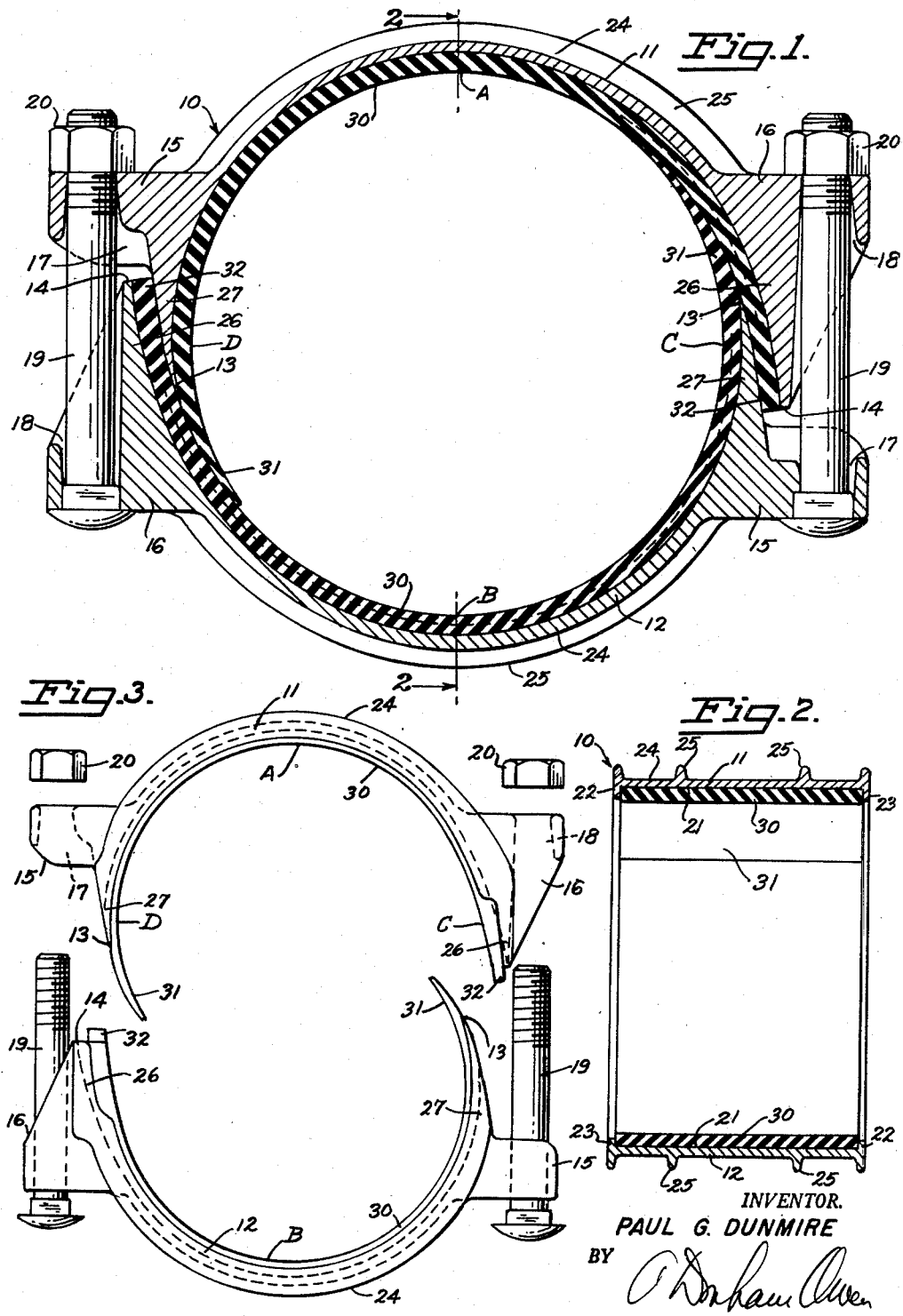

2,936,186

PIPE COUPLING WITH OVERLAPPED GASKET

Paul G. Dunmire, Oakland, Calif., assignor to Smith-Blair, Inc., South San Francisco, Calif., a corporation of California Application January 25, 1957, Serial No. 636,266

5 Claims. (Cl. 285—373)

This invention relates to an improved pipe coupling or repair clamp for broken pipe.

In pipe couplings and repair clamps for complete radial breaks heretofore in use there have been difficulties in obtaining a tight seal at the ends of the gasket or gaskets. Any failure to meet meant leaks, and so did uneven overlap. Minor differences in pipe size precluded successful use of such prior-art couplings.

A principal object of the present invention is to provide a coupling that seals tightly at all points around the pipe, without the necessity of having the gasket "tailor made" for one specific pipe outer diameter or using complicated locking fingers or tapered lap joints.

Another object of the invention is to provide a coupling that will accommodate minor differences in pipe sizes and still give a tight seal.

Another object of the invention is to provide a novel pipe coupling whose gasket ends can overlap and accommodate relatively large variations in pipe diameters without producing leaks.

Another object is to provide a coupling wherein one end of the gasket extends free to accommodate differences in pipe size and differences in circumference brought about while tightening the couplings.

Another object is to protect an overlapping gasket by metal at all points over the gasket so as to prevent blowouts.

Another object of the invention is to provide an unusually easily applied pipe coupling where it is possible to visually check the gasket joint during application.

Another object of the invention is to provide a pipe coupling initially having a generally elliptical shape and tightening into a circular shape around the pipes, while compressing a gasket evenly therearound.

Other objects and advantages of the invention will appear from the following description of preferred embodiments thereof presented in accordance with 35 USC 112.

In the drawings:

Fig. 1 is a view in elevation and in section of a coupling embodying the principles of the invention. In this form of the invention the sleeve is made up of two separate sections, each with a gasket bonded therein.

Fig. 2 is a view in section on a reduced scale taken along the line 2—2 in Fig. 1.

Fig. 3 is an end view in elevation on a reduced scale of a coupling like that of Fig. 1 disassembled.

Figure 4:
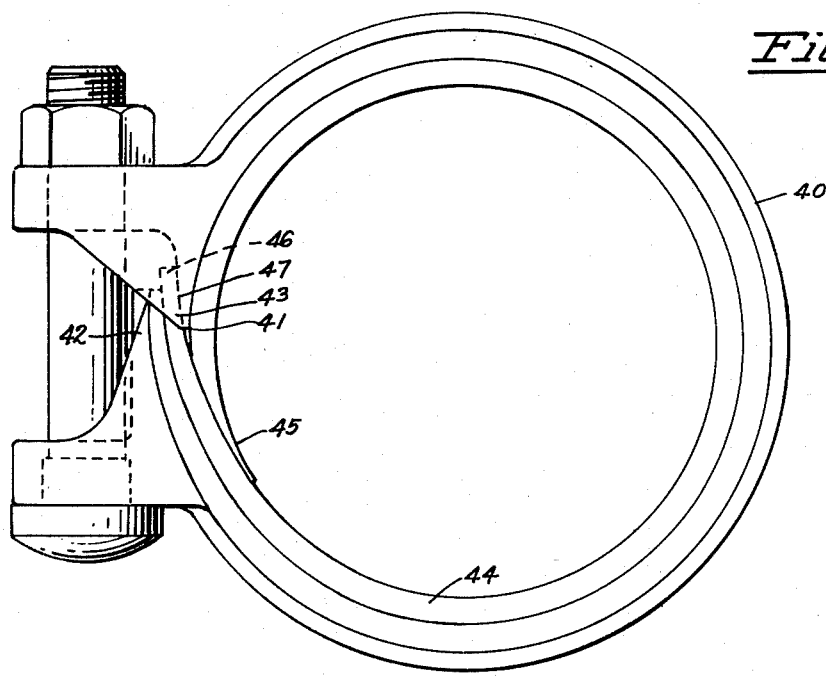
Fig. 4 is a view in elevation of a modified form of the invention in which there is only a single split sleeve.

The coupling 10 shown in Fig. 1 comprises two sleeve halves 11 and 12. Each sleeve half is preferably a casting with approximately 18% ductility or elongation and is made from material such as bronze, malleable iron, or ductile iron. Each sleeve half 11, 12 is provided adjacent each end 13, 14 with one or more lugs 15, 16 adapted to provide bolt openings 17, 18 through which one or more bolts 19 may pass, which, when nuts 20 are threaded thereon, serve to tighten the coupling 10 about the pipes.

The inner periphery of each sleeve half 12, 13 is provided with a gasket-receiving channel 21 between end rims 22, 23. The outer periphery 24 may be provided with reinforcing ribs 25. The sleeve halves extend more than 180°, so that one end portion 26 is intended to partially overlap the other end portion 27 of the opposite sleeve.

A gasket 30 is bonded in the channel 21 of each sleeve. In its flat form, each gasket 30 is a generally rectangular sheet with one end 31 tapered and the other end 32 square cut. The gasket 30 is bonded in the channel 21 so that the taper 31 begins and extends out past the end 13 of the sleeve, and the square end also extends beyond its end 14.

When the coupling is installed on pipe ends, the gasket 30 lies next to the pipe with the free square cut end 32 overlapping the tapered end 31 and extending therebeyond onto the outer periphery 24 of that part of the other sleeve. When the bolts 19 are tightened, their pressure is applied first at points A and B, which lie substantially parallel to the bolts intermediate the sleeve ends 13, 14. At this time points C and D 90° therefrom are not actually in engagement with the pipe end. However, subsequent tightening wraps the sleeves around the pipe, due to their malleability. The point of pressure therefore moves from A and B toward C and D. At the beginning the square cut gasket end 32 slides over the tapered end 31 to accommodate the difference in size created by this wrapping action. Further tightening of the bolt brings the pressure points circumferentially from points A and B around toward the bolts, ending up with the final application of pressure directly at the gasket overlap.

It will be obvious from the foregoing that a wide range of differences or tolerances in pipe diameters can be accommodated since the square end 32 of the gasket 30 will continue to slide by the taper 31 until the gasket 30 is tight on the pipe. When the pressure is applied at the lap, as the casting wraps itself around the pipe, the metal portion 26 overlaps the metal portion 27 at all times at the lap and prevents any danger of the gasket's blowing out there. It will thus be noted that this novel coupling utilizes variable pressure points in planned sequence to effect the sealing. Also, that the gasket will not be too short or bunch up inside the unit, unlike the situations that occur where the gasket is confined within the coupling.

Figure 5:
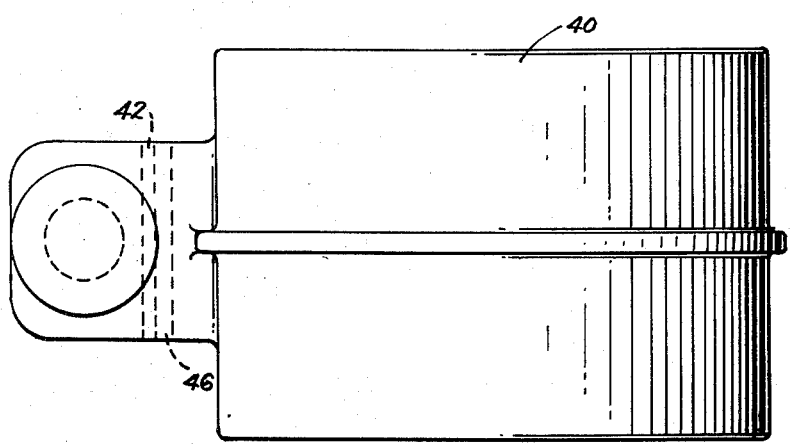
Fig. 5 is a plan view of the coupler of Fig. 4.

In the modified form of the invention shown in Figs. 4 and 5 there is a single clamp member 40, with one split 41, but it operates in substantially the same manner as that already described. Its ends 42, 43 overlap each other at the point 41. The single gasket 44 again is bonded to the sleeve 40 and has a tapered end 45 and a square end 46 extending out over the adjacent sleeve portion at 47. The operation is substantially the same as that heretofore described except that only one set of bolts is tightened.

These clamps may be of any length desired and may have any number of bolts extending along their length, depending upon the type of installation desired.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pipe coupling including in combination a split metal sleeve having at least one axial juncture, each with an outer end portion overlapping an inner end portion, said sleeve having generally cylindrical inner and outer peripheries; at least one gasket, there being the same number of gaskets as junctures, each gasket being bonded to the inner periphery of the sleeve, one end of each gasket being tapered and secured to and extending beyond said inner portion, the other end being square-cut and secured to said outer end portion and, on assembly, extending onto the outer periphery of said inner end portion; and means for tightening each juncture, whereby upon assembly the outer metal sleeve end portion and its square-cut gasket portion overlaps the inner sleeve end portion and its tapered gasket portion, so that said inner sleeve end portion lies between the two end portions of said gasket.

2. The coupling of claim 1 wherein the inner end portion is itself tapered to a narrow axial edge where the two gasket portions meet and diverge around it.

3. A pipe coupling including in combination a split metal sleeve having at least one axial juncture, each with an outer end portion overlapping an inner end portion, and bolt-receiving lug means adjacent each said juncture, said sleeve also having a generally cylindrical inner periphery with a wide central gasket-receiving channel between narrow peripheral end rims; at least one gasket, there being the same number of gaskets as junctures, each gasket being bonded to a said channel, and having an inner end portion attached to and extending beyond said inner end portion of said sleeve, said gasket inner end portion being tapered in thickness from the end of said sleeve inner end portion to its own end, and a square-cut outer end portion secured to said outer sleeve end portion and overlying said tapered gasket end and extending therebeyond and onto the outer periphery of said sleeve inner end portion; and bolt means through said lug means for tightening each juncture, whereby during the initial portions of said tightening, said square end is free to slide over said tapered end to accommodate the tightening and differences in pipe sizes, and whereby upon assembly said sleeve outer end portion and its attached gasket outer end portion overlaps said sleeve inner end portion and its gasket inner end portion so that the sleeve inner end portion lies between the two gasket end portions.

4. A pipe coupling including in combination an axially split malleable metal sleeve having two generally semicylindrical portions providing a pair of axial junctures with overlap of said portions at each juncture, where a first end lies inside a second end, said portions providing mating bolt-receiving lug means adjacent each juncture, said sleeve portions each having a generally semicylindrical outer periphery and a generally semicylindrical inner periphery having a wide central gasket-receiving channel between narrow peripheral end rims; two rubber gaskets, one bonded to each sleeve portion in said channel, and each having a tapered end extending beyond said first end of its sleeve portion, and a square-cut end adjacent said second end of its sleeve portion and overlying the said tapered end of the other gasket and extending around a portion of the outer periphery of the first end of the other sleeve portion; and bolt means through said lug means for tightening each juncture, whereby during the initial portions of said tightening, said square ends are free to slide over said tapered ends to accommodate the tightening and differences in pipe sizes, the overlap portion of said sleeve protecting said gaskets against blowing out, whereby said bolt means exerts a tightening pressure through said sleeves and gaskets on the pipes being coupled, said pressure being exerted first in between said ends and as tightening continues, said sleeves are wrapped securely around said pipes, the final pressure being exerted at said overlap portions, and whereby upon assembly each second end of said sleeve and its square-cut gasket end overlaps the first end of the other sleeve portion and its tapered gasket end, each first end then being between a tapered gasket end and a square-cut gasket end.

5. A pipe coupling including in combination a metal sleeve having one axial split providing a juncture with an outer end portion overlapping an inner end portion and bolt-receiving lug means adjacent thereto, said sleeve also having a generally cylindrical outer periphery and a generally cylindrical inner periphery with a wide central gasket-receiving channel between narrow peripheral end rims; a gasket bonded in said channel, and having a tapered end extending beyond said inner sleeve end portion and a square-cut end extending beyond said outer sleeve end portion and overlying said tapered end and extending over a portion of the outer periphery of said inner sleeve end portion; and bolt means through said lug means for tightening each juncture, whereby during the initial portions of said tightening, said square-cut end is free to slide over said tapered end to accommodate the tightening and differences in pipe sizes and whereby said square-cut gasket end lies between said inner and outer sleeve ends and said inner sleeve end portion lies between the two gasket portions.

References Cited in the file of this patent

UNITED STATES PATENTS

| 863,887 | Stuttle | Aug. 20, 1907 |
| 982,028 | Austin | Jan. 17, 1911 |
| 1,996,741 | Benge | Apr. 9, 1935 |
| 2,408,572 | Morehouse | Oct. 1, 1946 |
| 2,690,193 | Smith | Sept. 28, 1954 |

FOREIGN PATENTS

| 571,345 | Germany | Feb. 27, 1933 |
| 703,105 | France | Feb. 2, 1931 |